(12) United States Patent
Jain et al.

(10) Patent No.: US 11,348,034 B1
(45) Date of Patent: May 31, 2022

(54) COMPUTER BASED SYSTEM FOR DETECTING ELECTRONIC ACTIVITY PATTERNS AND METHODS OF USE THEREOF

(71) Applicant: American Express Travel Related Services Co., Inc., New York, NY (US)

(72) Inventors: Anshul Jain, Gurgaon (IN); Sharad Kumar Agrawal, Gurgaon (IN); Bobby Chetal, Gurgaon (IN); Ayush Jain, Rajasthan (IN); Arun Dutta, New Delhi (IN)

(73) Assignee: American Express Travel Related Services Company, Inc., New York, NY (US)

( * ) Notice: Subject to any disclaimer, the term of this patent is extended or adjusted under 35 U.S.C. 154(b) by 138 days.

(21) Appl. No.: 16/701,789

(22) Filed: Dec. 3, 2019

Related U.S. Application Data

(63) Continuation of application No. 16/682,335, filed on Nov. 13, 2019, now abandoned.

(51) Int. Cl.
    *G06Q 30/02*     (2012.01)
    *G06N 20/00*     (2019.01)
    *G06Q 20/40*     (2012.01)

(52) U.S. Cl.
    CPC ......... *G06N 20/00* (2019.01); *G06Q 30/0201* (2013.01); *G06Q 20/4016* (2013.01)

(58) Field of Classification Search
CPC . G06N 20/00; G06Q 30/0201; G06Q 20/4016
See application file for complete search history.

(56) References Cited

U.S. PATENT DOCUMENTS

2013/0232045 A1*   9/2013   Tai .................... G06Q 10/10
                                                  705/35
2019/0378050 A1*  12/2019   Edkin ............... G06Q 30/0185
(Continued)

OTHER PUBLICATIONS

"Research and Improvement of Isolation Forest in Detection of Local Anomaly Points" (Gap, Rongang et al, published Jun. 2019 at Journal of Physics Conference Series 1237 052023) (Year: 2019).*

(Continued)

*Primary Examiner* — James M Detweiler
(74) *Attorney, Agent, or Firm* — Sterne, Kessler, Goldstein & Fox P.L.L.C.

(57) ABSTRACT

At least some embodiments are directed to an exemplary computer-based electronic activity tracking system that detects activity patterns receiving data values that represent at least one electronic activity. The exemplary electronic activity tracking system includes a detector of unsecure electronic activities that identifies electronic activity patterns performed by a user or non-person entity. The detector of unsecure electronic activities utilizes unsupervised machine learning techniques to detect the electronic activity patterns. The detected electronic activity patterns correspond to unsecure or malicious electronic activities. The electronic activity tracking system outputs notifications indicative of identified unsecure or malicious activity patterns and identifies entities associated with such unsecure or malicious activity patterns. The exemplary electronic activity tracking system implements a graphical user interface operated from a client computing device. The graphical user interface enables a user of the client computing device to perform actions upon the detection of the unsecure or malicious activity patterns.

20 Claims, 10 Drawing Sheets

(56) References Cited

U.S. PATENT DOCUMENTS

2020/0234305 A1* 7/2020 Knutsson ............... G06N 20/00
2020/0242673 A1* 7/2020 Liu .................... G06Q 30/0605

OTHER PUBLICATIONS

"Detection of Anomalous Vital Sign of Elderly Using Hybrid K-means Clustering and Isolation Forest" (Kurnianingsih et al. published Oct. 2018 at the TENCON 2018 IEEE Region 10 Conference) (Year: 2018).*

* cited by examiner

| 701 | 703 | 705 | 707 | 709 | 711 | 713 | 715 | 717 | 719 |
|---|---|---|---|---|---|---|---|---|---|
| CARD MEMBER NAME | EMPLOYEE ID | TYPE | MARKET | REGION | ACCOUNT # | FLAGGED TRANSACTION | HEALTH CATEGORY | AMOUNT | TRANSACTIONS |
| Jane Doe | 1647 | Corp Card | Germany | Europe | 758167 | 122 Critical 6 Moderate | Critical | $2,648 | 128 |
| Jon Doe | 9872 | Corp Card | Australia | Asia-Pacific | 134572 | 57 Critical 8 Moderate | Critical | $35,658 | 220 |

FIG. 7

| DATE 801 | AMOUNT 803 | MERCHANT 805 | LOCATION 807 | MERCHANT CLASS 809 | FLAGGED RULES 811 | BILLED 813 | STATUS 815 | ACTIONS 817 |
|---|---|---|---|---|---|---|---|---|
| 09/19 | $11,458 | DIAMOND CO. | US | JEWELRY STORE | DISALLOWED SPEND | YES | PENDING | TEXT / EMAIL |
| 08/16 | $18,225 | CLOTHING CO. | US | DEPARTMENT STORE | RETAIL SPEND | YES | PENDING | TEXT / EMAIL |

FIG. 8

COMPUTER BASED SYSTEM FOR DETECTING ELECTRONIC ACTIVITY PATTERNS AND METHODS OF USE THEREOF

CROSS-REFERENCE TO RELATED APPLICATIONS

This application is a Continuation of, and claims priority to and benefit of U.S. patent application Ser. No. 16/682,335 filed on Nov. 13, 2019 and entitled "COMPUTER BASED SYSTEM FOR DETECTING ELECTRONIC ACTIVITY PATTERNS AND METHODS OF USE THEREOF," which is incorporated herein by reference in its entirety.

BACKGROUND OF TECHNOLOGY

A computer system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

Some of the computing devices in the system may store large records representing electronic activities associated with one or more users. Electronic activities associated with a user may significantly differ from electronic activities of another user. Thus, detecting malicious or unsecure electronic activities for a given user can be a sometimes inaccurate, resource intensive, and complex problem.

SUMMARY OF DESCRIBED SUBJECT MATTER

In some embodiments, the present disclosure provides an exemplary technically improved computer-based system/method/apparatus that includes at least the following components/steps of a computer-based electronic activity tracking system that detects activity patterns by receiving data values that represent at least one electronic activity. The electronic activity tracking system includes a detector of unsecure electronic activities that identifies electronic activity patterns performed by a user or non-person entity. The detector of unsecure electronic activities utilizes unsupervised machine learning techniques to detect the electronic activity patterns. The detected electronic activity patterns correspond to unsecure or malicious electronic activities. The electronic activity tracking system outputs a notification indicative of identified unsecure or malicious activity patterns and identifies the users or non-person entities associated with such unsecure or malicious activity patterns. The electronic activity tracking system implements a graphical user interface operated from a client computing device. The graphical user interface enables a user of the client computing device to perform actions upon the detection of the unsecure or malicious activity patterns.

In some embodiments, the present disclosure provides an exemplary technically improved computer-based system/method/apparatus that includes at least the following components/steps of receiving, by at least one processor, a plurality of data values that represent at least one electronic activity. The at least one processor executes a principal component analysis computational process to produce a set of values associated with uncorrelated variables of the plurality of data values that represent the at least one electronic activity. The at least one processor inputs the set of values associated with the uncorrelated variables of the plurality of data values that represent the at least one electronic activity into a clustering model to produce a first set of scores associated with the at least one electronic activity. The at least one processor inputs the set of values associated with the uncorrelated variables of the plurality of data values that represent the at least one electronic activity into an isolation forest model to produce a second set of scores associated with the at least one electronic activity. The at least one processor inputs the second set of scores associated with the at least one electronic activity into the clustering model to produce a third set of scores associated with the at least one electronic activity. The at least one processor inputs the first set of scores associated with the at least one electronic activity into the isolation forest model to produce a fourth set of scores associated with the at least one electronic activity. The at least one processor aggregates the third set of scores associated with the at least one electronic activity and the fourth set of scores associated with the at least one electronic activity to determine at least one activity pattern associated with the at least one electronic activity, and outputs a notification indicative of the at least one activity pattern of the at least one electronic activity to a user computing device.

In some embodiments, the at least one activity pattern is correlated with a transaction pattern and the transaction pattern is correlated with an unsecure spending pattern. The at least one processor determines the activity pattern based on variables, features, or characteristics of the at least one electronic activity including transaction recency, a transaction frequency, a transaction monetary features, a transaction acceleration rate, and a transaction type.

In some embodiments, the at least one processor trains the isolation forest model and the clustering model applying at least one unsupervised machine learning technique and a bagging machine learning training technique.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-10 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 1:
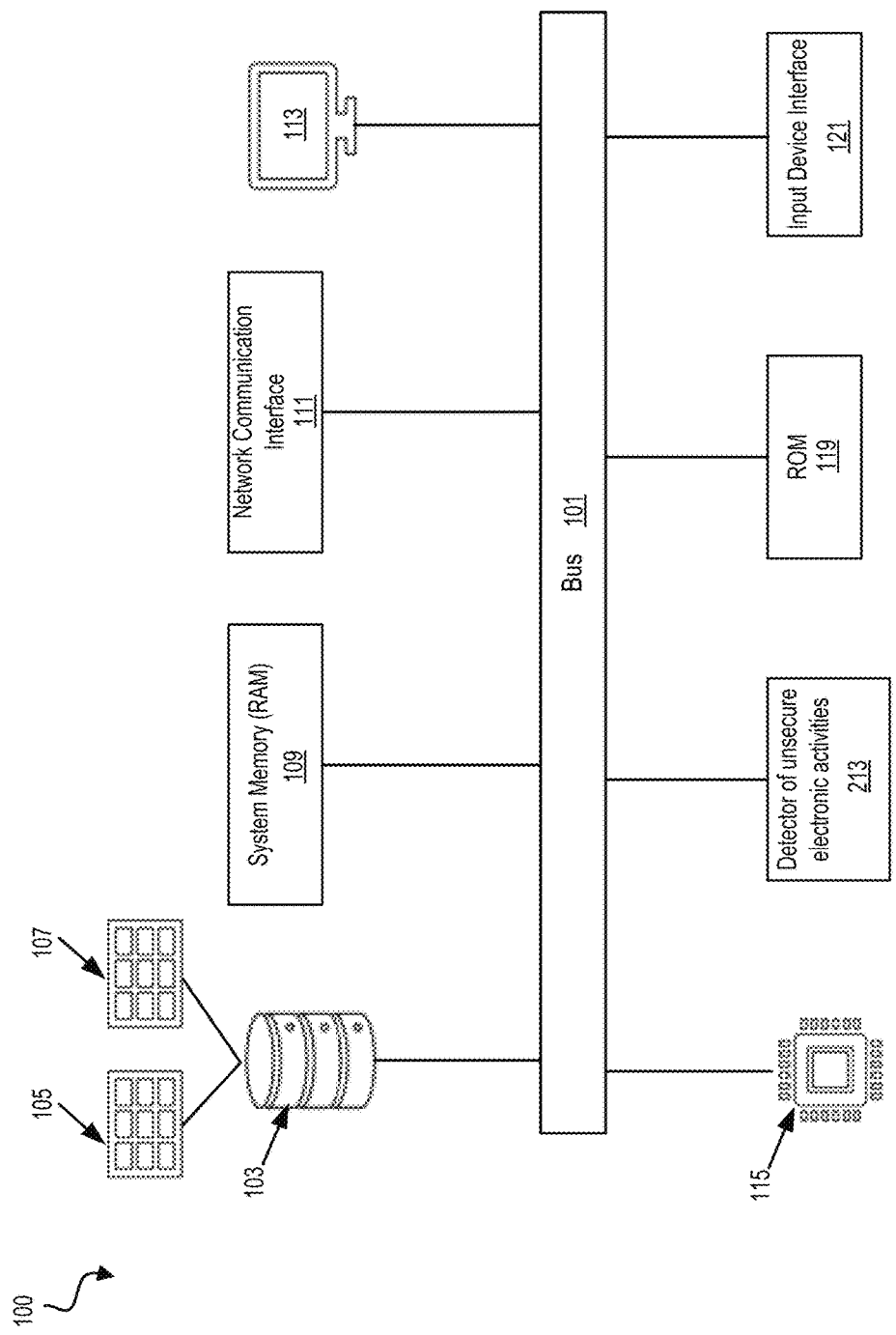

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; and flash memory devices. In some implementations a machine-readable medium may include storage devices, databases and other memory devices shown in FIG. 1.

As used herein, the terms "computer engine" and "engine" identify at least one software component and/or a combination of at least one software component and at least one hardware component which are designed/programmed/configured to interact with other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, one or more of exemplary inventive computer-based systems of the present disclosure may include or be incorporated, partially or entirely into at least one personal computer (PC), laptop computer, tablet, portable computer, television, smart device (e.g., smart phone, smart tablet or smart television), mobile internet device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2)

Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many ways as a software component such as, without limitation, a stand-alone software package, a combination of software packages, or it may be a software package incorporated as a "tool" in a larger software product.

For example, software specifically programmed in accordance with one or more principles of the present disclosure may be downloadable from a network a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000, and so on. As used herein, the term "user" shall have a meaning of at least one user.

As used herein, terms "cloud" and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

FIGS. 1 through 10 illustrate systems and methods of detection of malicious or unsecure electronic activity based on machine learning techniques. The following embodiments provide technical solutions and/or technical improvements that overcome technical problems, drawbacks and/or deficiencies in the technical fields involving the analysis and detection of malicious or unsecure data patterns of electronic activity. As explained in more detail, below, technical solutions and/or technical improvements herein include aspects of improved detection of data patterns corresponding to unsecure electronic activity. Based on the detection of malicious or unsecure data patterns of electronic activity, further technical benefits become available to users and operators of these systems and methods. Moreover, various practical applications of the disclosed technology are also described, which provide further practical benefits to users and operators that are also new and useful improvements in the art.

FIG. 1 illustrates an example of and implementation of a detector of unsecure electronic activity according to an illustrative embodiment of the present disclosure. In some embodiments, an electronic activity tracking system 100 can include a communication bus 101, a processor 115, a system memory (RAM) 109, a read-only memory (ROM) 119, a database or storage device 103, an input device interface 121, an output device interface such as display 113, and a network communication interface 111.

In some embodiments, the communication bus 101 collectively represents system, peripheral, and/or chipset buses that communicatively connect the numerous internal devices of the electronic activity tracking system 100. The communication bus 101 may be a physical interface for interconnecting the various components, however in some embodiments, the communication bus 101 may be a network interface, router, switch, or other communication interface.

In some embodiments, the electronic activity tracking system 100 may receive and/or store multiple datasets or records, for example, datasets or records 105 and 107. Datasets or records 105 and 107 can include data values or data points associated with electronic activities performed by one or more users, or non-person entities such as commercial entities, including merchants, industrial entities, firms and businesses, governmental organizations or other suitable non-person entities. Some examples of electronic activities can include electronic transactions related to payments, purchases, or other suitable type of electronic activities or transactions. The various components of the electronic activity tracking system 100 may interoperate to detect activity patterns corresponding to malicious or unsecure electronic activities through the detector of unsecure electronic activities 213 discussed below with respect to FIG. 2.

In some embodiments, the electronic activity tracking system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, error logs, security reports, among other data related to the operation of the electronic activity tracking system 100.

In some embodiments, a database or storage device 103 stores datasets or records 105 and 107 including data values that represent electronic activities or electronic transactions performed by one or more users. The datasets or records 105 and 107 can include variables associated with electronic activities including transaction recency (i.e., quality or state of being recent), a transaction frequency, a monetary amount associated with a transaction, an acceleration rate associated with a set of transactions, a type of transaction, and other suitable variables associated with an electronic activity or transaction. The database or storage device 103 can be updated in real-time or near real-time based when a user or non-person entity performs an electronic activity. In some implementations the database or storage device 103 can be part of a financial institution system, merchant system, online store system, or other suitable entity capable of registering electronic activities once the electronic activities are performed by a user or non-person entity. The database or storage device 103 may communicate with one or more other components of the system 100 via, e.g., the communication bus 101 to provide datasets or records 105 and 107 in real-time or near real-time. Accordingly, the electronic activity tracking system 100 can detect activity patterns corresponding to malicious or unsecure electronic activities immediately (in real-time or near real-time) after one or more electronic activities or transactions have been executed by a user or non-person entity.

In some embodiments, a user or administrator may interact with the electronic activity tracking system 100 via a display 113 and a user input device interface 121. The input device interface 121 may include, e.g., a mouse, a keyboard, a touch panel of the display 113, motion tracking and/or detecting, a microphone, an imaging device such as a digital camera, among other input devices. Results and statuses related to the electronic activity tracking system 100 and operation thereof may be displayed to the user via the display 113. Some examples of such results and statuses include summarized reports of detected unsecure electronic activities, a graphical user interface showing non-compliant or unsecure electronic activity associated with multiple users, a graphical user interface with a set of non-compliant or unsecure electronic activity associated with a single user and other suitable results or statuses associated with the detection of activity patterns corresponding to malicious or unsecure electronic activities.

As shown in FIG. 1, communication bus 101 can also couple the electronic activity tracking system 100 to a network (e.g., network 1007 shown in FIG. 10) through a network communication interface 111. In this manner, the electronic activity tracking system 100 can be part of a network of computers (for example a local area network ("LAN"), a wide area network ("WAN"), or an Intranet, or a network of networks, for example the Internet. Any or all components of the electronic activity tracking system 100 can be used in conjunction with the subject technology.

Figure 2:
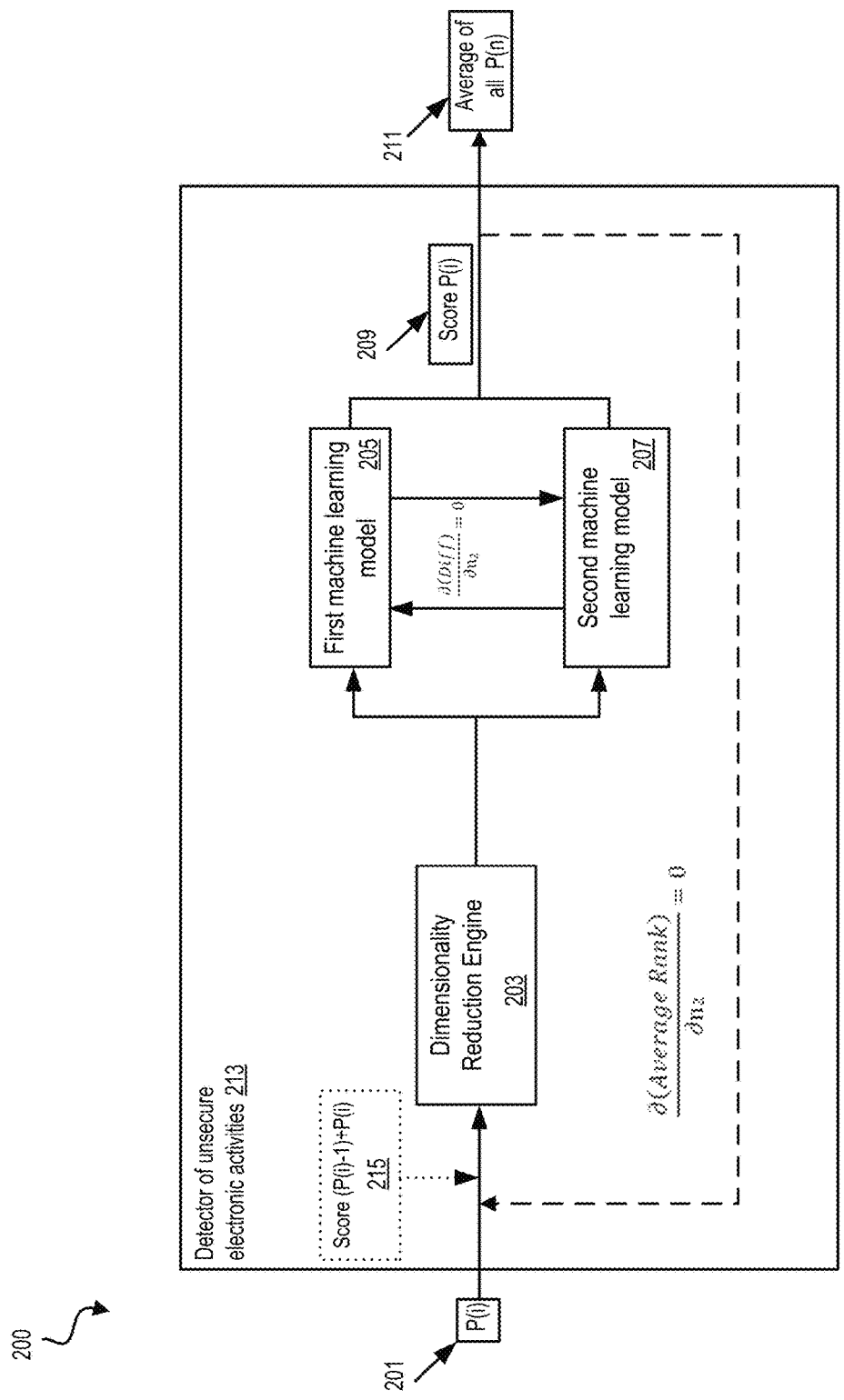

FIG. 2 is a detector of unsecure electronic activities in accordance with one or more embodiments of the present disclosure. In some embodiments, the detector of unsecure electronic activities 213 includes a dimensionality reduction engine 203 and one or more unsupervised machine learning models including, a first machine learning model 205, and a second machine learning model 207.

In some embodiments, the dimensionality reduction engine 203 includes computer-readable instructions to execute an unsupervised statistical technique used to examine the interrelations among a set of variables. The dimensionality reduction engine 203 can be a principal component analysis engine that uses an orthogonal transformation to convert a set of observations of possibly correlated variables (entities each of which takes on various numerical values) into a set of values of linearly uncorrelated variables called principal components. This transformation can be defined in such a way that the first principal component has the largest possible variance (that is, accounts for as much of the variability in the data as possible), and each succeeding component in turn has the highest variance possible under the constraint that it is orthogonal to the preceding components. The resulting vectors (each being a linear combination of the variables and containing n observations) are an uncorrelated orthogonal basis set.

In some embodiments, the first machine learning model 205 divides a population or data points into different groups to produce a collection of data points based on similarity and dissimilarity features between such data points. Data points in the same groups are more like other data points in the same group and dissimilar to the data points in other groups. In some implementations the first machine learning model 205 can utilize a k-means technique or other suitable clustering technique. In some implementations the first machine learning model 205 can be a clustering model that: a) defines different groups to use and randomly initializes their respective center points; b) classifies or scores each data point by computing the distance between that data point and each group center, and then classify the point to be in the group whose center is closest to it; and c) re-computes the group center based on these classified points by taking the mean of all the vectors in the group. This process can be repeated for a set number of iterations or until the group centers does not change much between iterations.

The second machine learning model 207 isolates data points by randomly selecting a feature and then randomly selecting a split value between the maximum and minimum values of the selected feature. The second machine learning model 207 can isolate anomaly observations or data points, in some instances, an anomaly score can be calculated as the number of conditions required to separate a given data point. In some implementations, the second machine learning model 207 can be an isolation forest model that can separate data points by first building isolation trees, or random decision trees. Then, a score can be calculated as the path length to isolate the data point.

In some embodiments, a random set of data points 201 associated with one or more electronic activities can be selected or received by the detector of unsecure electronic activities 213. The random set of data points 201 can be selected or received from the database or storage device 103 discussed above with reference to FIG. 1. Such data points can be associated with an activity e.g., electronic transactions or other suitable activities. The random set 201 can be represented as P(i) data points (or population) where i∈1, 2, 3, . . . , n with x(i) set of variables (also selected at random), where i∈1, 2, 3, . . . , n. The P(i) data points with the x(i) variables can be inputted into the dimensionality reduction engine 203 to, for example, reduce the variance and dimensionality of the P(i) and x(i) variables. The resulting data from the dimensionality reduction engine 203 can be inputted separately to a) the first machine learning model 205 and b) the second machine learning model 207. The first machine learning model 205 can generate scores for the P(i) data points and sends such scores with the P(i) data points to the second machine learning model 207. Likewise, the second machine learning model 207 can generate scores for the P(i) data points and sends such scores with the P(i) data points to the first machine learning model 205. In some implementations, the exchange of scores between the first machine learning model 205 and the second machine learning model 207 is iteratively executed numerous times until the scores generated by the first machine learning model 205 and the scores generated by the second machine learning model 207 do not change when compared to a previous iteration as further discussed with reference to FIG. 4. In some implementations, the exchange of scores between the first machine learning model 205 and the second machine learning model 207 is executed until there is no change when compared to a previous iteration or when the change is below a predefined threshold value.

In some embodiments, once each of the scores generated by the first machine learning model 205 and the second machine learning model 207 stabilizes, i.e., do not change when compared to a last or previous iteration, the scores generated by the first machine learning model 205 and the scores generated by the second machine learning model 207 can be aggregated to generate a final score for the P(i) data points 209.

In some embodiments, a bagging computational technique can be utilized to combine weak predictor models and generate a stronger predictor model with better accuracy or performance i.e., and optimized detector of unsecure electronic activity 213. Such a bagging technique can be enabled by sampling input data (with replacements) to generate multiple training sets of input data. The predictor model (e.g., Detector of unsecure electronic activities 213) can be trained to generate a trained model for each of the training sets used during trained phase to produce a set of different and independent trained models. Accordingly, the prediction of an unseen sample of data points (e.g., a sample of data points not used during the training of the set of different and independent trained models) can be computed by inputting the unseen sample of data points into the different individual trained models.

In some embodiments, a final prediction can be obtained as a function of the predictions of the different individual trained models e.g., the average of the individual predictions 211. For instance, a final score for P(i−1) population computed on the (i−1)$^{th}$ iteration can be combined with a sample of data points Pi for an i$^{th}$ iteration as shown at 215, where i∈1, 2, 3, . . . , n. Such a combination can be inputted to the dimensionality reduction engine 203 such that, the input is furthered processed by the dimensionality reduction engine 203, the first machine learning model 205, and the second machine learning model 207 as discussed above. The scores generated during the bagging iterations can be aggregated or averaged to generate a final score, for example, average of all P(n) as shown at 211. The score P(i) shown at 209 and/or the average of all P(n) shown at 211 can be used by the detector of unsecure electronic activities to determine an activity pattern, for example a transaction pattern correlated with an unsecure spending pattern as discussed with reference to FIG. 9. Such an activity pattern can be determined when the score P(i) shown at 209 and/or the average score of all P(n) shown at 211 corresponds to, for example, outlying electronic activities in comparison to other electronic activities made by the same user or non-person entity or in comparison to other users or non-person entities. Some examples of activity patterns detected by the detector of unsecure electronic activities 213 are discussed below with reference to FIG. 9.

Figure 3:
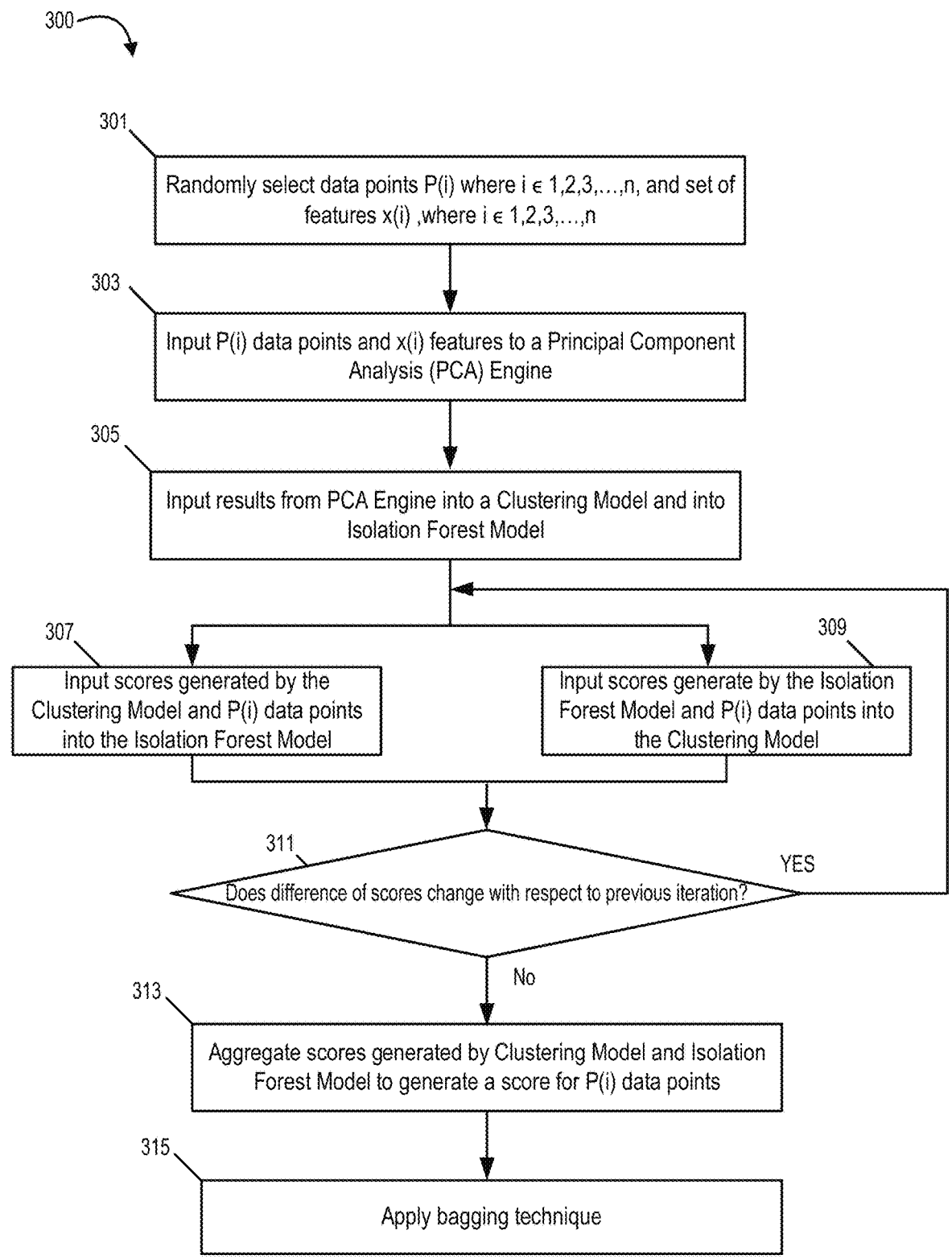

FIG. 3 is a flow chart illustrative of computations executed by a detector of unsecure electronic activities in accordance with one or more embodiments of the present disclosure. In some embodiments, a set of data points P(i) where i∈1, 2, 3, . . . , n with x(i) set of variables, where i∈1, 2, 3, . . . , n. are randomly selected at 301. The randomly selected data points P(i) and variables x(i) are inputted at 303 to an exemplary PCA engine of the present disclosure. At 305, the results from the PCA engine are inputted in parallel and independently into an exemplary Clustering Model of the present disclosure and into exemplary Isolation Forest Model of the present disclosure. Thereafter, an iterative loop begins in which the scores generated by the exemplary Clustering Model and P(i) data points are inputted into the exemplary Isolation Forest Model, and the scores generated by the exemplary Isolation Forest Model and the P(i) data points are inputted into the exemplary Clustering Model. Such an iterative loop continues until the scores generated by the exemplary Clustering Model and the scores generated by the exemplary Isolation Forest Model do not change with respect to a previous iteration as shown in conditional statement 311 and further discussed with respect to FIG. 4. In some instances, when at the conditional statement 311 it is determined that the difference of scores between the exemplary Clustering Model and the exemplary Isolation Forest Model have changed with respect to a previous iteration, then the flow continues at 307 and 309. In some other instances, when at the conditional statement 311 it is determined that the difference of scores between the exemplary Clustering Model and the exemplary Isolation Forest Model have not changed with respect to a previous iteration then the flow continues at 313. At 313, the detector of unsecure electronic activities aggregates the scores generated by the exemplary Clustering Model and the exemplary Isolation Forest Model to generate a score for the P(i) data points. In some implementations a bagging technique can be applied as discussed above with respect to FIG. 2.

Figure 4:
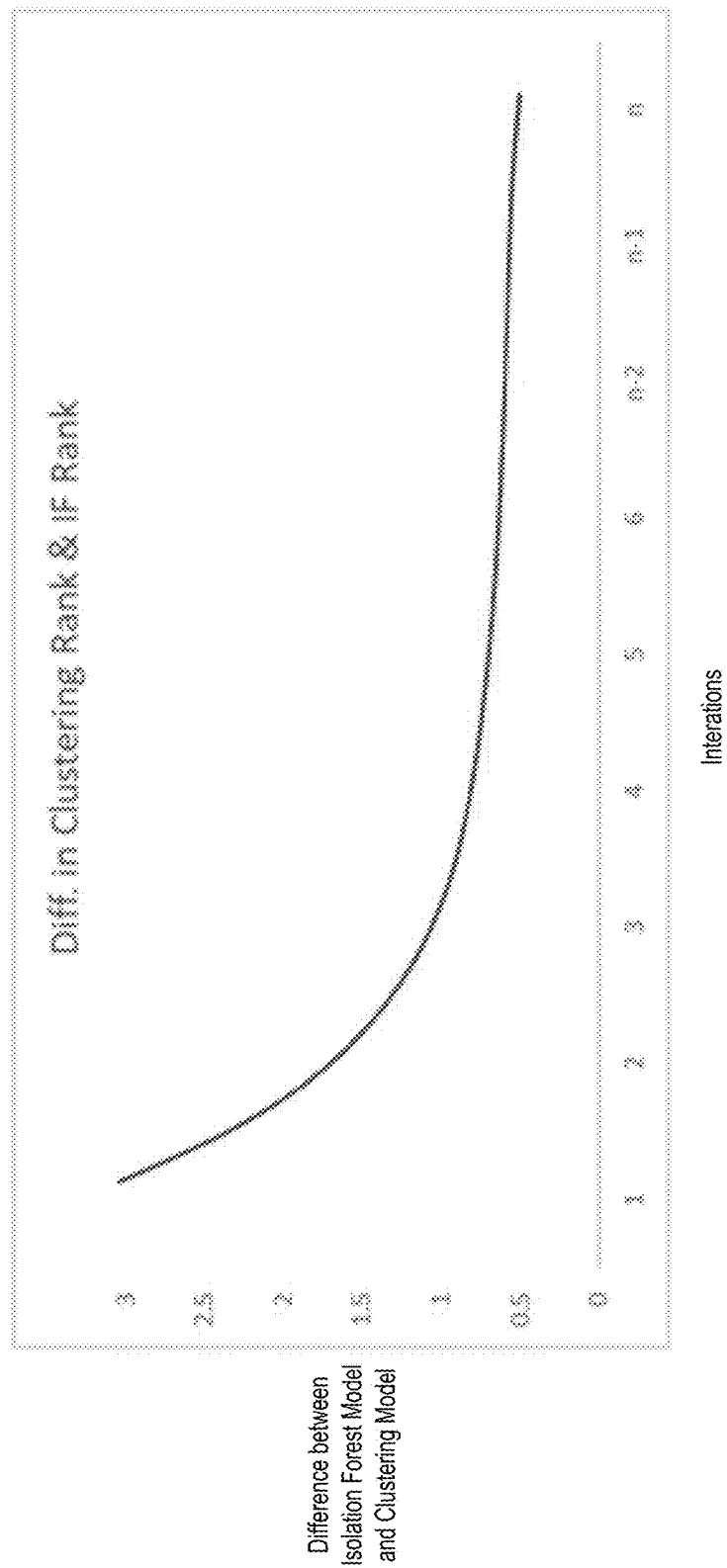

FIG. 4 is a graph illustrative of scoring differences between the exemplary Isolation Forest Model and the exemplary Clustering Model after several iterations in accordance with one or more embodiments of the present disclosure. In some embodiments the difference of scores between the exemplary Isolation Forest Model and the exemplary Clustering Model can be given by:

$$\text{Diff} = \text{Score}_{IFM} - \text{Score}_{CM}$$

where $\text{Score}_{IFM}$ is the score generated by the exemplary Isolation Forest Model and $\text{Score}_{CM}$ is the score generated by the exemplary Clustering Model, and where Score→Rank, and $$\frac{\partial (\text{Diff})}{\partial n_2} = 0$$

where $n_2 \in 1, 2, 3, \ldots, n$.

It can be appreciated in FIG. 4 that the difference between the scores generated by the exemplary Isolation Forest Model and the exemplary Clustering Model stabilizes after n number of iterations.

Figure 5:
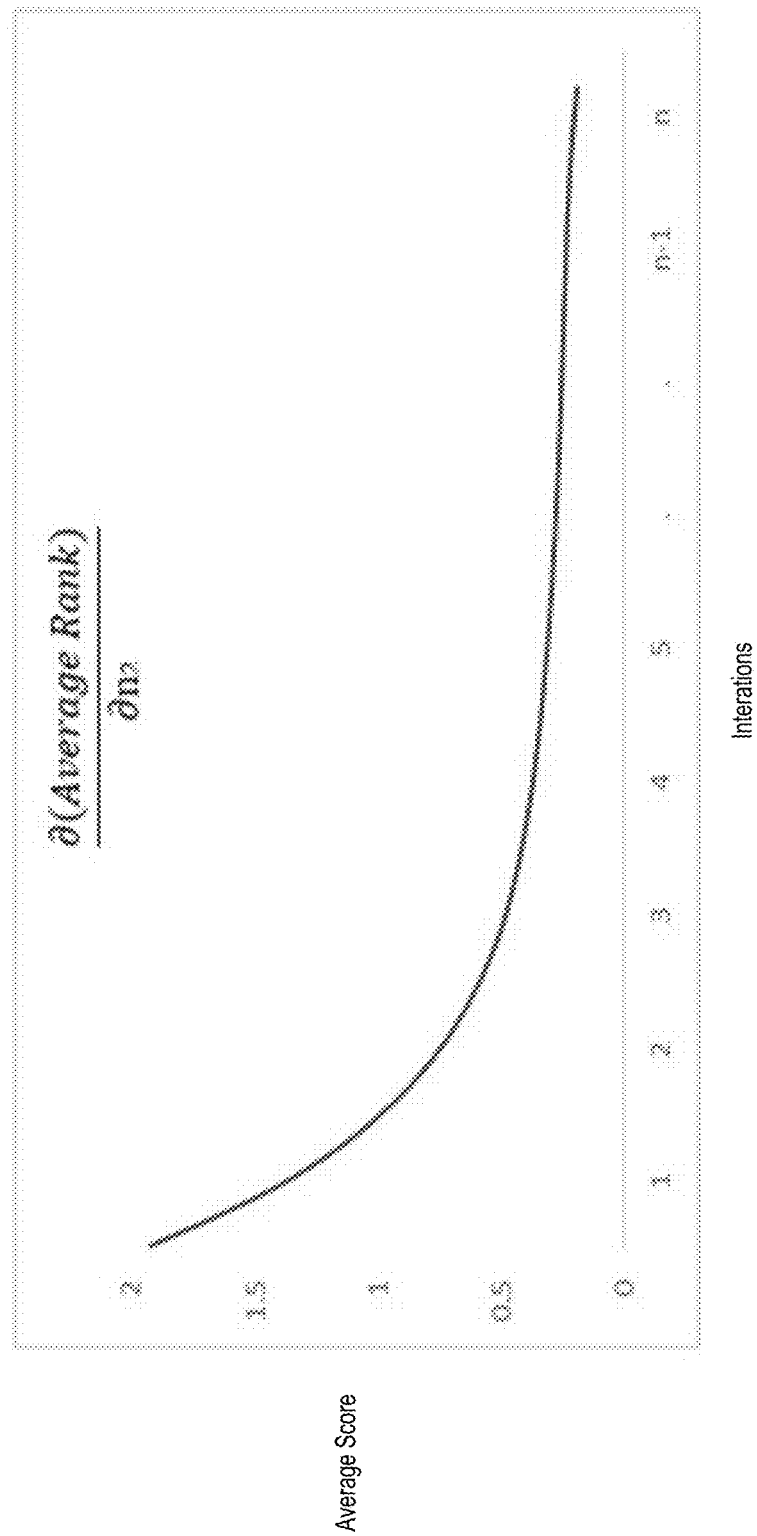

FIG. 5 is a graph illustrative of the difference between the average score computed for P(i) data points after several iterations in accordance with one or more embodiments of the present disclosure. The average scores or ranks from the bagging iterations during the training phase of the detector of unsecure electronic activities can be expressed as:

$$\frac{\partial (\text{Average Rank})}{\partial n_2} = 0$$

where $n_2 \in 1, 2, 3, \ldots, n$.

It can be appreciated in FIG. 5 that the difference between computed average rank or scores between iterations decreases as the number of bagging iterations increases. Differently stated, the application of the bagging technique results in better accuracy and performance of the detector of unsecure electronic activities.

Figure 6:
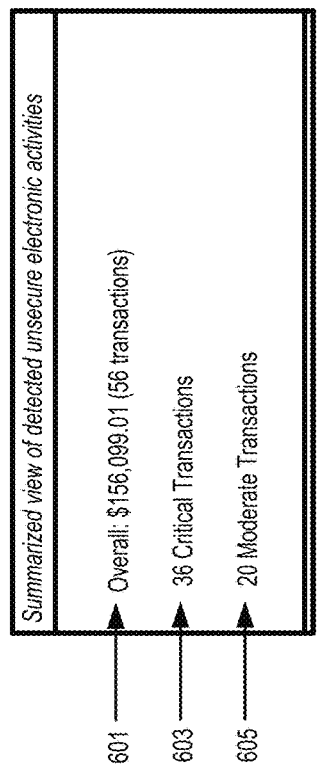
Figure 6:

FIG. 6 illustrates a summarized view of detected unsecure electronic activities in accordance with one or more embodiments of the present disclosure. In some embodiments, the detector of unsecure electronic activities can be coupled to a display device (e.g., display device 113 in FIG. 1). The detector of unsecure electronic activities can send instructions to render on the display the number of tracked transactions 601, and from those transactions display a number of transactions that are predicted to be critical 603, and a number of transactions that are predicted to be moderate 605, as shown in screenshot 600.

FIG. 7 illustrates a graphical user interface with a set of non-compliant or unsecure electronic activity associated with multiple users in accordance with one or more embodiments of the present disclosure. In some embodiments, the detector of unsecure electronic activity can send instructions to render on a display (e.g., display device 113 in FIG. 1) information regarding electronic transactions made by multiple users as shown in screenshot 700. Such details can include; a card member name 701, an employee identification number (when applicable) 703, a type of card used in the electronic transaction (e.g., corporate card) 705, a market in which electronic transactions took place (e.g., United Kingdom, Germany, Austria) 707, regions 709 in which electronic transactions took place (e.g., Europe, Asia/Pacific), an account number associated with the card holder who made the electronic transaction 711, a number of flagged transactions (e.g., number of transactions predicted to be critical transactions and number of transactions predicted to be moderate transactions) 715, a health category associated with a transaction (e.g., critical or non-critical) 715, an amount associated with a transaction (e.g., dollars amount) 717, and a transaction number 719.

FIG. 8 illustrates a graphical user interface with a set of non-compliant or unsecure electronic activity associated with a user in accordance with one or more embodiments of the present disclosure. In some embodiments, the detector of unsecure electronic activity can send instructions to render on a display (e.g., display device 113 in FIG. 1) detailed information regarding electronic transactions made by a user as shown in screenshot 800. Such detailed information can include the date when the transaction was made 801, the amount associated with a transaction 803, the merchant associated with the transaction 805, the location where the transaction took place 807, a merchant classification or category (e.g., jewelry store, department store, ticket agency, or other suitable category), flagged rules (e.g., retail spend, or disallowed spend) 811, whether the transaction has been billed or unbilled 813, whether the transaction is pending 815 or other suitable transaction status, and a set of actions that can be taken to contact the user associated with an electronic activity for example, sending an email, text message, or other suitable communication as shown at 817.

Figure 9:
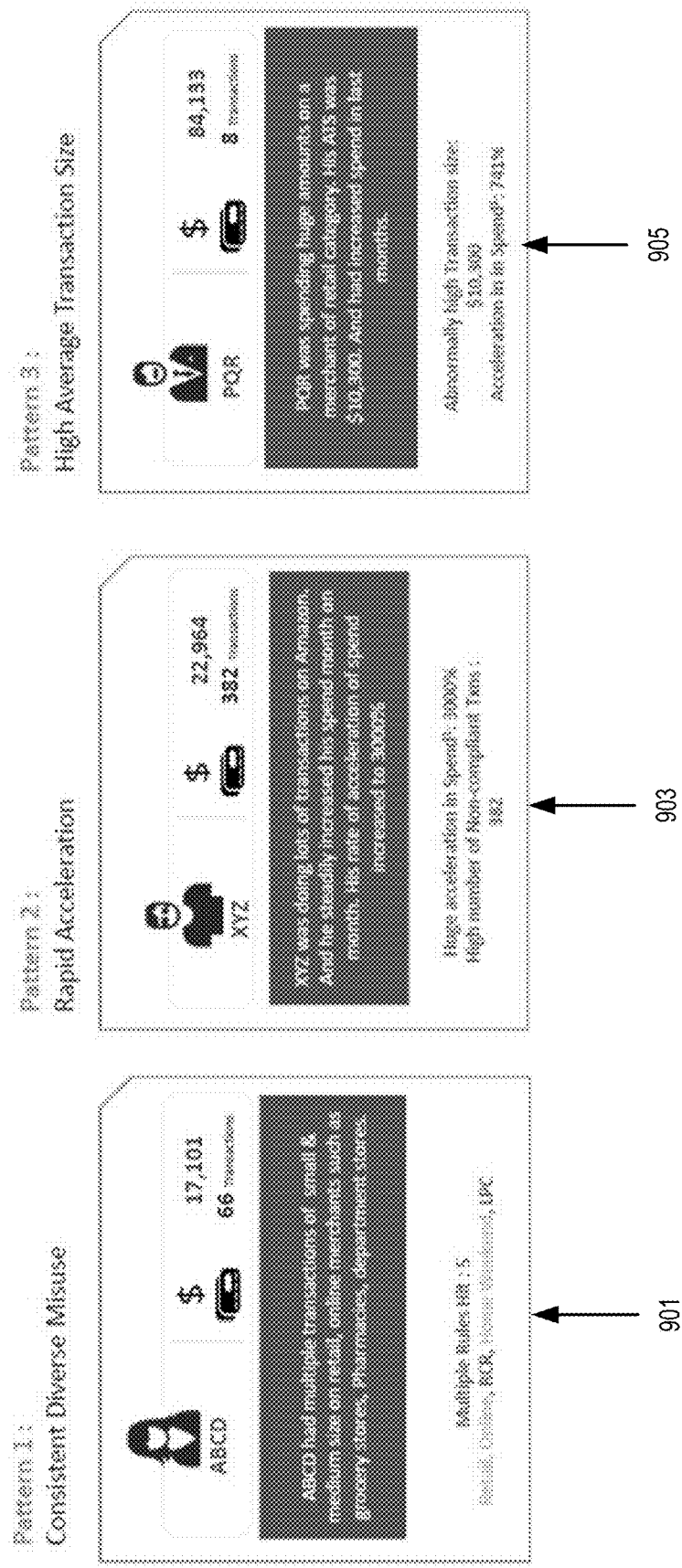

FIG. 9 illustrates examples of detected activity patterns corresponding to non-compliant or unsecure electronic activity associated with a user in accordance with one or more embodiments of the present disclosure. In some instances, the detector of unsecure electronic activities can identify an activity pattern corresponding to consistent diverse activities 901, an activity pattern corresponding to rapid acceleration of activities 903, an activity pattern corresponding to a high average transaction size 905, and other suitable activity patterns associated with a user or non-person entity. At 901 the detector of unsecure electronic activities identifies an activity pattern associated with a user that have made multiple transactions of small and medium size on retail, online merchants such as grocery stores, pharmacies, and department stores. At 903 the detector of unsecure electronic activities identifies an activity pattern associated with a user that has a 3000% spending acceleration rate and multiple non-compliance transactions. At 905 the detector of unsecure electronic activities identifies an activity pattern associated with a user that has an abnormal transaction of $10,300 and an increase in his spending acceleration rate.

Figure 10:
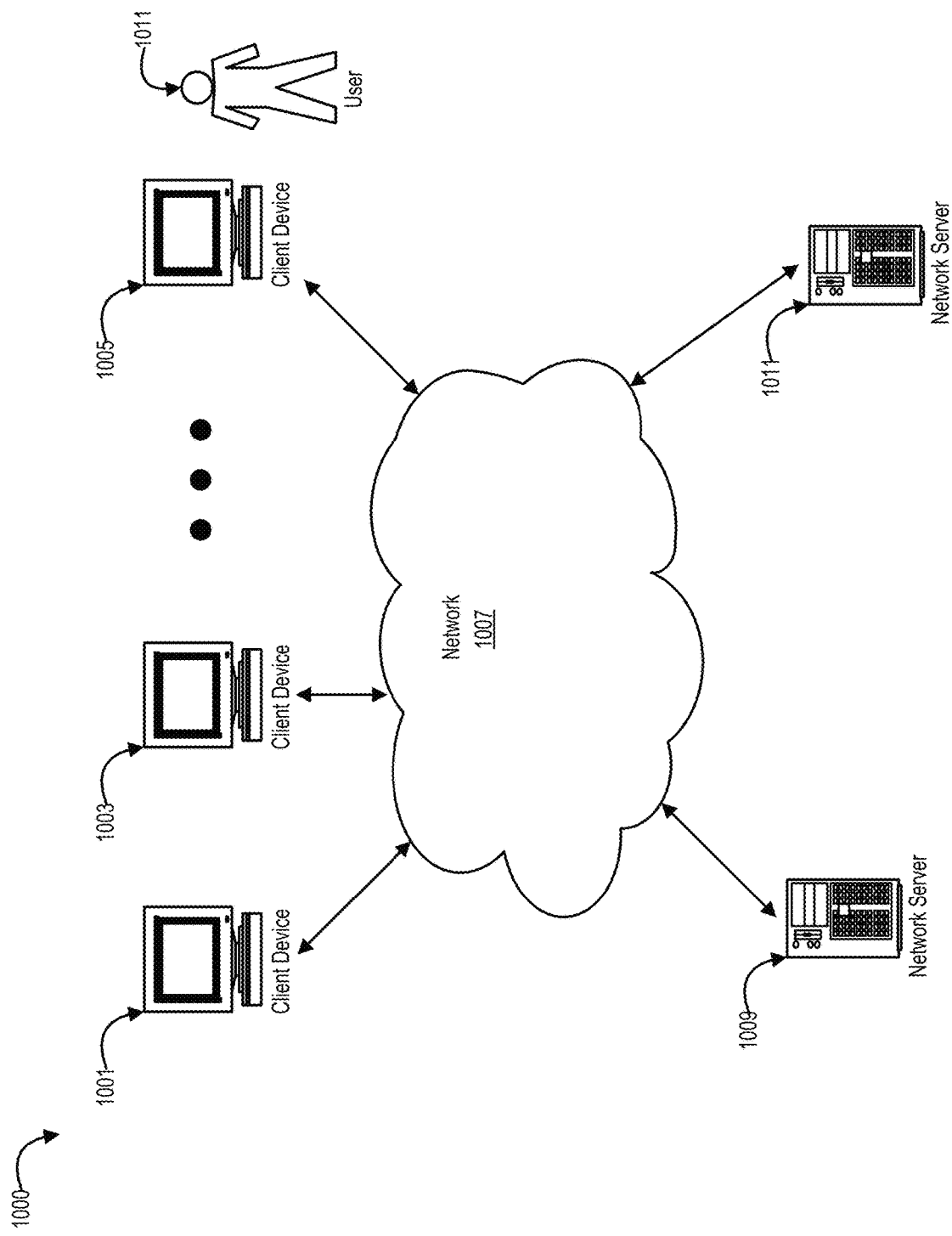

FIG. 10 depicts a block diagram of an exemplary computer-based system 1000 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system 1000 may be configured to manage large numbers of members and/or concurrent transactions or electronic activities, as detailed herein. In some embodiments, the exemplary computer-based system 1000 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 10, members 1001, 1003, and 1005 (e.g., clients) of the exemplary computer-based system 1000 may include virtually any computing device capable of receiving and sending a message over a network (e.g., cloud network), such as network 1007, to and from another computing device, such as servers 1009 and 1011, each other, and the like. In some embodiments server 1009 can implement the electronic activity tracking system discussed above with reference to FIG. 1. In some embodiments server 1011 can be part of a financial institution system, merchant system, online store system, or other suitable entity capable of registering electronic activities once the electronic activities are performed by a user or non-person entity. In some embodiments server 1011 can implement the database or storage device 103 discussed above with reference to FIG. 1. In some embodiments the member devices 1001, 1003, and 1005 can implement points of sale or other system that register electronic activities performed by users or non-person entities. In some embodiments, the member devices 1001, 1003, and 1005 may be personal computers, multiprocessor systems, microprocessor-based or programmable consumer electronics, network PCs, and the like. In some embodiments, one or more member devices within member devices 1001, 1003, and 1005 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 1001, 1003, and 1005 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 1001, 1003, and 1005 may run one or more applications, such as Internet browsers, mobile applications, voice calls, video games, videoconferencing, and email, among others. In some embodiments, one or more member devices within member devices 1001, 1003, and 1005 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1001, 1003, and 1005 may be specifically programmed by either Java, .Net, QT, C, C++ and/or other suitable programming language. In some embodiments, one or more member devices within member devices 1001, 1003, and 1005 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the exemplary network 1007 may provide network access, data transport and/or other services to any computing device coupled to it. In some embodiments, the exemplary network 1007 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 1007 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 1007 may include and implement, as an alternative or in conjunction with one or more of the above, a WiMAX architecture defined by the WiMAX forum. In some embodiments and, optionally, in combination of any embodiment described above or below, the exemplary network 1007 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 1007 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 1007 may also include mass storage, such as network attached storage (NAS), a storage area network (SAN), a content delivery network (CDN) or other forms of computer or machine-readable media.

In some embodiments, the exemplary server 1009 or the exemplary server 1011 may be a web server (or a series of servers) running a network operating system, examples of which may include but are not limited to Microsoft Windows Server, Novell NetWare, or Linux. In some embodiments, the exemplary server 1009 or the exemplary server 1011 may be used for and/or provide cloud and/or network computing. Although not shown in FIG. 10, in some embodiments, the exemplary server 1009 or the exemplary server 1011 may have connections to external systems like email, SMS messaging, text messaging, ad content providers, etc. Any of the features of the exemplary server 1009 may be also implemented in the exemplary server 1011 and vice versa.

In some embodiments, one or more of the exemplary servers 1009 and 1011 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 1001, 1003, and 1005. [59] In some embodiments and, optionally, in combination of any embodiment described above or below, for example, one or more exemplary computing member devices 1001, 1003, and 1005, the exemplary server 1009, and/or the exemplary server 1011 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

At least some aspects of the present disclosure will now be described with reference to the following numbered clauses.

Clause 1: A method, comprising:

receiving, by at least one processor, a plurality of data values that represent at least one electronic activity;

inputting, by the at least one processor, a set of values associated with uncorrelated variables of the plurality of data values that represent the at least one electronic activity into a first machine leaning model to produce a first set of scores associated with the at least one electronic activity, wherein the first machine learning model produces the first set of scores based on similarity of features associated with the set of values;

inputting, by the at least one processor, the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;

inputting, by the at least one processor, the second set of scores associated with the at least one electronic activity into the first machine learning model to produce a third set of scores associated with the at least one electronic activity;

inputting, by the at least one processor, the first set of scores associated with the at least one electronic activity into the second machine learning model to produce a fourth set of scores associated with the at least one electronic activity;

aggregating, by the at least one processor, the third set of scores associated with the at least one electronic activity and the fourth set of scores associated with the at least one electronic activity to determine at least one activity pattern associated with the at least one electronic activity; and outputting, by the processor, a notification indicative of the at least one activity pattern of the at least one electronic activity to a user computing device.

Clause 2: The method of clause 1, wherein the at least one activity pattern is correlated with a transaction pattern.

Clause 3: The method of clause 2, wherein the transaction pattern is correlated with an unsecure spending pattern.

Clause 4: Any method of clause 1-3, wherein the first machine learning model and the second machine learning model are trained to determine the at least one activity pattern applying at least one unsupervised machine learning technique.

Clause 5: Any method of clause 1-3, wherein the first machine learning model and the second machine learning model are trained to determine the at least one activity pattern applying a bagging machine learning training technique.

Clause 6: Any method of clause 1-3, wherein the activity pattern is determined based on at least one of a transaction recency, a transaction frequency, a transaction monetary feature, a transaction acceleration rate, and a transaction type.

Clause 7: Any method of clause 1-3, wherein the first machine learning model is a clustering model and produces the first set of scores and the third set of scores applying a k-means clustering technique.

Clause 8: Any method of clause 1-3, wherein the second machine learning model is an isolation forest model.

Clause 9: Any method of clause 1-3, wherein the plurality of data values that represent the at least one activity is associated with a user.

Clause 10: Any method of clause 1-3 further comprising:
executing, by the at least one processor, a principal component analysis computational process to produce the set of values associated with uncorrelated variables of the plurality of data values that represent the at least one electronic activity.

Clause 11: An apparatus, comprising:
a processor; and
a memory storing instructions which, when executed by the processor, causes the processors to:
receive, by at least one processor, a plurality of data values that represent at least one electronic activity;
input the set of values associated with the uncorrelated variables of the plurality of data values that represent the at least one electronic activity into a first machine learning model to produce a first set of scores associated with the at least one electronic activity, wherein the first machine learning model produces the first set of scores based on similarity of features associated with the set of values;
input the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;
input the second set of scores associated with the at least one electronic activity into the first machine learning model to produce a third set of scores associated with the at least one electronic activity;
input the first set of scores associated with the at least one electronic activity into the second machine learning model to produce a fourth set of scores associated with the at least one electronic activity;
aggregate the third set of scores associated with the at least one electronic activity and the fourth set of scores associated with the at least one electronic activity to determine at least one activity pattern associated with the at least one electronic activity; and
output a notification indicative of the at least one activity pattern of the at least one electronic activity to a user computing device.

Clause 12: The apparatus of clause 11, wherein the at least one activity pattern is correlated with a transaction pattern.

Clause 13: The apparatus of clause 12, wherein the transaction pattern is correlated with an unsecure spending pattern.

Clause 14: Any apparatus of clause 11-13, wherein the first machine learning model and the second machine learning model are trained to determine the activity pattern applying at least one unsupervised machine learning technique.

Clause 15: Any apparatus of clause 11-13, wherein the first machine learning model and the second machine learning model are trained to determine the at least one activity pattern applying a bagging machine learning training technique.

Clause 16: Any apparatus of clause 11-13, wherein the activity pattern is determined based on at least one of a transaction recency, a transaction frequency, a transaction monetary feature, a transaction acceleration rate, and a transaction type.

Clause 17: Any apparatus of clause 11-13, wherein the first machine learning model is a clustering model and produces the first set of scores and the second set of scores applying a k-means clustering technique.

Clause 18: Any apparatus of clause 11-13, wherein the second machine learning model is an isolation forest model.

Clause 19: Any apparatus of clause 11-13, wherein the memory storing instructions which, when executed by the at least one processor, causes the processor to:
execute a principal component computational process to produce the set of values associated with uncorrelated variables of the plurality of data values that represent the at least one electronic activity.

Clause 20: A non-transitory computer readable medium comprising code which, when executed by a processor, causes the processor to:
receive, by at least one processor, a plurality of data values that represent at least one electronic activity;
input the set of values associated with the uncorrelated variables of the plurality of data values that represent the at least one electronic activity into a first machine learning model to produce a first set of scores associated with the at least one electronic activity, wherein the first machine learning model produces the first set of scores based on similarity of features associated with the set of values;
input the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;

input the second set of scores associated with the at least one electronic activity into the first machine learning model to produce a third set of scores associated with the at least one electronic activity;

input the first set of scores associated with the at least one electronic activity into the second machine learning model to produce a fourth set of scores associated with the at least one electronic activity;

aggregate the third set of scores associated with the at least one electronic activity and the fourth set of scores associated with the at least one electronic activity to determine at least one activity pattern associated with the at least one electronic activity; and output a notification indicative of the at least one activity pattern of the at least one electronic activity to a user computing device.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method, comprising:
   a) receiving, by at least one processor, a plurality of data values that represent at least one electronic activity;
   b) inputting, by the at least one processor, a set of values associated with uncorrelated variables of the plurality of data values that represent the at least one electronic activity into a first machine learning model to produce a first set of scores associated with the at least one electronic activity, wherein the first machine learning model produces the first set of scores based on similarity of features associated with the set of values;
   c) inputting, by the at least one processor, the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;
   d) inputting, by the at least one processor, the second set of scores associated with the at least one electronic activity and the set of values into the first machine learning model to produce a third set of scores associated with the at least one electronic activity;
   e) inputting, by the at least one processor, the first set of scores associated with the at least one electronic activity and the set of values into the second machine learning model to produce a fourth set of scores associated with the at least one electronic activity;
   f) repeating step d) and step e) until a difference between the fourth set of scores and the third set of scores is stable;
   g) aggregating, by the at least one processor, the third set of scores associated with the at least one electronic activity and the fourth set of scores associated with the at least one electronic activity to determine at least one activity pattern associated with the at least one electronic activity; and
   h) outputting, by the at least one processor, a notification indicative of the at least one activity pattern of the at least one electronic activity to a user computing device.

2. The method of claim 1, wherein the at least one activity pattern is correlated with a transaction pattern.

3. The method of claim 2, wherein the transaction pattern is correlated with an unsecure spending pattern.

4. The method of claim 1, wherein the first machine learning model and the second machine learning model are trained to determine the at least one activity pattern by applying at least one unsupervised machine learning technique.

5. The method of claim 1, wherein the first machine learning model and the second machine learning model are trained to determine the at least one activity pattern by applying a bagging machine learning training technique.

6. The method of claim 1, wherein the activity pattern is determined based on at least one of a transaction recency, a transaction frequency, a transaction monetary feature, a transaction acceleration rate, and a transaction type.

7. The method of claim 1, wherein the first machine learning model is a clustering model and produces the first set of scores and the third set of scores by applying a k-means clustering technique.

8. The method of claim 1, wherein the second machine learning model is an isolation forest model.

9. The method of claim 1, wherein the plurality of data values that represent the at least one activity is associated with a user.

10. The method of claim 1, further comprising:
    executing, by the at least one processor, a principal component analysis computational process to produce the set of values associated with the uncorrelated variables of the plurality of data values that represent the at least one electronic activity.

11. An apparatus, comprising:
    a processor; and
    a memory storing instructions which, when executed by the processor, cause the processor to:
    a) receive, by the processor, a plurality of data values that represent at least one electronic activity;
    b) input a set of values associated with uncorrelated variables of the plurality of data values that represent the at least one electronic activity into a first machine learning model to produce a first set of scores associated with the at least one electronic activity, wherein the first machine learning model produces the first set of scores based on similarity of features associated with the set of values;
    c) input the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;
    d) input the second set of scores associated with the at least one electronic activity and the set of values into the first machine learning model to produce a third set of scores associated with the at least one electronic activity;

e) input the first set of scores associated with the at least one electronic activity and the set of values into the second machine learning model to produce a fourth set of scores associated with the at least one electronic activity;

f) repeat step d) and step e) until a difference between the fourth set of scores and the third set of scores is stable;

g) aggregate the third set of scores associated with the at least one electronic activity and the fourth set of scores associated with the at least one electronic activity to determine at least one activity pattern associated with the at least one electronic activity; and h) output a notification indicative of the at least one activity pattern of the at least one electronic activity to a user computing device.

12. The apparatus of claim 11, wherein the at least one activity pattern is correlated with a transaction pattern.

13. The apparatus of claim 12, wherein the transaction pattern is correlated with an unsecure spending pattern.

14. The apparatus of claim 11, wherein the first machine learning model and the second machine learning model are trained to determine the activity pattern by applying at least one unsupervised machine learning technique.

15. The apparatus of claim 11, wherein the first machine learning model and the second machine learning model are trained to determine the at least one activity pattern by applying a bagging machine learning training technique.

16. The apparatus of claim 11, wherein the activity pattern is determined based on at least one of a transaction recency, a transaction frequency, a transaction monetary feature, a transaction acceleration rate, and a transaction type.

17. The apparatus of claim 11, wherein the first machine learning model is a clustering model and produces the first set of scores and the second set of scores applying a k-means clustering technique.

18. The apparatus of claim 11, wherein the second machine learning model is an isolation forest model.

19. The apparatus of claim 11, wherein the memory storing instructions which, when executed by the processor, cause the processor to:

execute a principal component computational process to produce the set of values associated with the uncorrelated variables of the plurality of data values that represent the at least one electronic activity.

20. A non-transitory computer readable medium comprising code which, when executed by a processor, causes the processor to:

a) receive a plurality of data values that represent at least one electronic activity;

b) input a set of values associated with uncorrelated variables of the plurality of data values that represent the at least one electronic activity into a first machine learning model to produce a first set of scores associated with the at least one electronic activity, wherein the first machine learning model produces the first set of scores based on similarity of features associated with the set of values;

c) input the set of values associated with the uncorrelated variables of the plurality of data values that represent the at least one electronic activity into a second machine learning model to produce a second set of scores associated with the at least one electronic activity, wherein the second machine learning model produces the second set of scores based on isolation of anomalous values from the set of values;

d) input the second set of scores associated with the at least one electronic activity and the set of values into the first machine learning model to produce a third set of scores associated with the at least one electronic activity;

e) input the first set of scores associated with the at least one electronic activity and the set of values into the second machine learning model to produce a fourth set of scores associated with the at least one electronic activity;

f) repeat step d) and step e) until a difference between the fourth set of scores and the third set of scores is stable;

g) aggregate the third set of scores associated with the at least one electronic activity and the fourth set of scores associated with the at least one electronic activity to determine at least one activity pattern associated with the at least one electronic activity; and h) output a notification indicative of the at least one activity pattern of the at least one electronic activity to a user computing device.

* * * * *